United States Patent [19]

Pascoe

[11] 4,205,922
[45] Jun. 3, 1980

[54] FONT AND COLUMN FORMAT CONTROL SYSTEM

[75] Inventor: Robert A. Pascoe, Round Rock, Tex.

[73] Assignee: International Business Machines Corporation, Armonk, N.Y.

[21] Appl. No.: 884,062

[22] Filed: Mar. 6, 1978

[51] Int. Cl.² ............................................. B41J 5/30
[52] U.S. Cl. ....................................... 400/171; 400/76; 400/279; 364/900
[58] Field of Search .................... 400/61, 62, 63, 64, 400/74, 76, 149, 150, 151, 151.1, 171, 172, 279, 280, 281, 282; 364/900

[56] References Cited

U.S. PATENT DOCUMENTS

| | | | |
|---|---|---|---|
| 3,645,372 | 2/1972 | Noell et al. | 400/171 |
| 3,892,303 | 7/1975 | Willcox | 400/171 |
| 3,952,852 | 4/1976 | Greek et al. | 400/279 |
| 4,026,403 | 5/1977 | Inose et al. | 400/61 |
| 4,086,660 | 4/1978 | McBride | 364/900 |

OTHER PUBLICATIONS

IBM Technical Disclosure Bulletin, "Composing Systems Which Incorporate Font Changing and Impression Setting From Tape or Card Input", Hunt et al., vol. 13, No. 5, Oct. 1970, p. 1149.

Primary Examiner—Ernest T. Wright, Jr.
Attorney, Agent, or Firm—James H. Barksdale, Jr.

[57] ABSTRACT

A system for handling multiple printer font requirements during playout of a plurality of sequentially stored text columns in a side-by-side format. A line from one column is printed on a print line, the carrier is caused to escape, and any corresponding line from a succeeding column is printed on the same line. Printing and escapement continue until all corresponding lines from each column are printed on the same print line prior to causing a printer carrier return. During playout within a column, or from column to column, printer font requirements stored with the text are used to determine subsequent system events. If one of the columns, or a portion thereof, is to be printed in a different type style or language, the system will signal a need for a font change, stop the playout and await an indication that a font change has been made.

7 Claims, 19 Drawing Figures

FONT AND COLUMN FORMAT CONTROL SYSTEM

DESCRIPTION

BACKGROUND OF THE INVENTION

1. Field of the Invention

This invention generally relates to printing systems which print out text stored in a buffer. More specifically, this invention relates to a system for controlling the output side-by-side printing of sequentially stored columns having varying printer font requirements.

2. Description of Prior Art (Prior Art Statement)

Representative of the closest known prior art are U.S. Pat. No. 3,952,852; the IBM Electronic "Selectric"* Composer; U.S. patent application Ser. No. 680,562, filed Apr. 27, 1976 having Michael E. McBride as inventor and entitled *Automatic Format Control for Text Printing System*, now U.S. Pat. No. 4,086,660, issued Apr. 25, 1978; and IBM Technical Disclosure Bulletin (TDB), Vol. 13, No. 5, October 1970, pages 1149 and 1150.

*Registered Trademark, International Business Machines Corporation.

In U.S. Pat. No. 3,952,852 a system is disclosed having basically a keyboard and printer, a buffer and control, and a multi-column playout control unit. During setup for input keying, a beginning of memory code is stored in the buffer. Also, since the input printer is the same as the output printer, a tab field is set up for defining the locations in which the columns are to be located. For columns which are to be keyed and stored sequentially, but printed out in a side-by-side manner, the beginning of each column is defined by the keying and storage of a column begin code. Each column is then keyed and stored in its entirety. At the end of the last column to be printed out in a side-by-side relationship, a column end code is keyed and stored. Upon playout from the buffer, the buffer memory established as described above is scanned when a column begin code is encountered. An operation flag is inserted into the buffer code memory after the first column begin code. After each column begin code except the first, a column marker code is inserted and scan continues. Upon detection of the column end code, scanning continues to the beginning of memory. When the operation flag is again detected, following characters and spaces are printed out in the defined mode until a carrier return is detected. The operation flag is advanced beyond the carrier return code, the printer is caused to tab rather than to return the carrier to the left margin, and a column advance operation is performed. This causes a column marker code to be written over the operation flag, and a scan of memory. The next detected column marker code is written over with a new operation flag. Printout then continues beginning at the point of the new operation flag until a carrier return is detected. The playout operations described continue until the end of each column is reached. After printout of all columns, the column marker codes are flushed from memory.

From the above, the side-by-side printout of sequentially stored text is fully disclosed, but system responsiveness to font change requirements has not been addressed.

Consider next the IBM Electronic "Selectric" Composer. If during a side-by-side printout of sequentially stored columns a change in the printer font is required from one column to another to accommodate a change in printing style or language group, the operator must have planned accordingly during input keying. That is, a special (stop) code must have been keyed and stored in memory at the beginning of each line of the column(s) to be affected. Upon printout from the memory, the system will recognize each stop code and cease printing. Thereafter, the operator will change fonts and start the printing operation again. The keying of stop codes for each line is extremely time consuming and tedious. Also, the keying position in terms of placement of stop codes requires a great deal of thought in applications requiring many and varied font changes. Further, the keyed and stored text cannot be adjusted without clearing the stop codes from memory.

Based on the above, the IBM Electronic "Selectric" Composer, although capable of automatically stopping during a side-by-side printout of sequentially stored columns, is not readily adaptable to printer font change requirements when throughput is a major consideration.

In the above-referenced McBride patent application, an automatic system is disclosed for controlling format during playout of a job made up of a number of pages recorded on a number of magnetic cards. At the beginning of a job and upon input keying, format information is keyed and stored in a text buffer. The format information is made up of tab set locations, measure length, index values, adjust modes, etc. For format changes prior to recording on a magnetic card, new format information is keyed and stored in the text buffer along with keyed text. Upon recording the text and format information on a card, the format information last in effect is transferred to a format buffer to control format until changed. Likewise, for later playout of text stored on magnetic cards, the format information last in effect will control format until changed.

This prior art is relevant in that different printer requirements from one segment to the next are readily handled. In the case of the instant application though, the segments are different columns stored in the same medium, whereas in the referenced McBride application, the segments are related to different media. Further, neither font changing nor side-by-side printout are addressed in the McBride application. Even if font changes are considered format changes, not addressed is the efficient handling of different printer font requirements within a segment which is operated upon only one line at a time. That is, in the instant application operation within any given column is only one line at a time in that an entire print line is completed with corresponding text from all columns before operation can resume in the given column.

The above-referenced IBM TDB discloses an automatic font changer responsive to operator stored codes. Although particularly relevant in the area of causing the printer to stop upon a font change code, not addressed are side-by-side printout of sequentially stored columns and the storing of the font requirements when printing from one column to another, one line at a time.

In summary, the above described art is relevant to varying degrees, but falls short of either anticipating or rendering the subject invention obvious. More specifically, the subject invention presents an advance over the prior art in terms of a system structured to effect a side-by-side playout of sequentially stored columns having font requirements stored therewith, separately store effective changes in font requirements, and respond to these changes. Some of the more important advantages of such a system are that operator coding during input keying is minimized, and there will be no cessation of printing if an intermediate column requiring a different font does not contain information to be printed.

SUMMARY OF THE INVENTION

A system is provided having a keyboard and printer, a buffer and control, a multi-column playout control, and a font change control having included printer font identification code stores. During input keying setup for later playout, font identification codes are keyed and stored along with text codes in a text and control code buffer. For text columns which are to be printed out in a side-by-side format with varying font requirements, the storing upon keying of the columns and font identification codes therefor is sequential. When printout begins, the first detected printer font identification code is stored in the font change control. Thereafter, when a column advance operation is initiated following printing of one line of a column on a print line to begin printing any corresponding line from the next column, there is a scan of the memory established during input keying and storage of text and font identification codes in the buffer. This is to detect any required change in printer fonts. A comparison is made between the last printer font identification code detected during the scan and the font identification code stored by the system in the font change control. If there is a difference, the system will alert the operator to effect a physical printer font change. If, however, no printout is required in the next column, due to an extra carrier return, or previous completion of printing of the next column, the system will not alert the operator. In this case, the system will advance to the next column for printout.

DESCRIPTION OF THE PREFERRED EMBODIMENT

Operations to be Performed

For a more detailed description of the invention, reference will first be made to those figures of the drawing which illustrate the operations to be performed in terms of both buffer memory arrangement and playout. To begin with, definitions of two terms basic to this application are in order. The term playout as used herein is meant to include system operations such as scan, column advance and printout. The term printout is meant to include system operations including actual printing after scan and column advance operations have been performed. For purposes of this application, this will include system operations when the operation flag is located within a line of a column and beyond a column begin code for the column. Other terms will be defined when appropriate in the following description.

Figure 1:
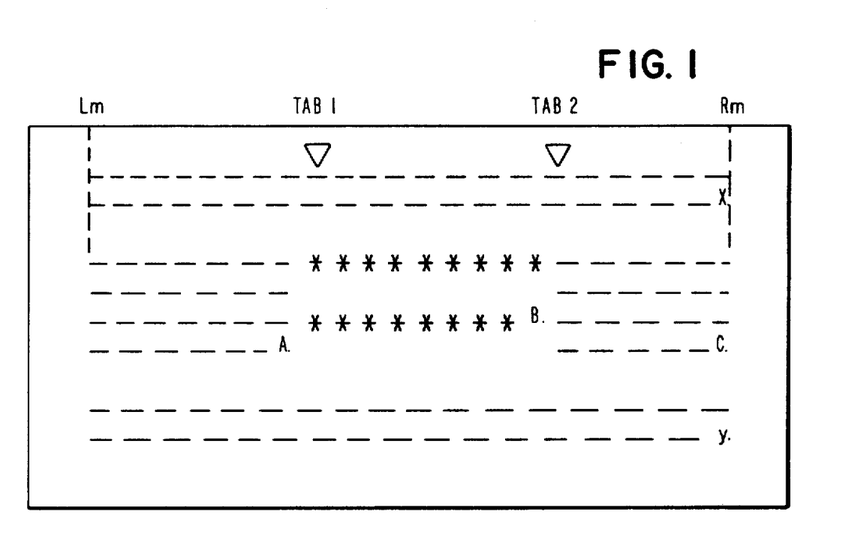
FIG. 1 is a pictorial representation of a desired output format including columns of text aligned side-by-side.

Referring first to FIG. 1, there is shown the desired output format. The left and right margins Lm and Rm have been set, as well as two tab positions designated as tab 1 and tab 2. The first and last two lines are shown printed between the left and right margins Lm and Rm. Intermediate these two sets of lines are three columns of varying length. The left column contains four lines which are to be printed with the left margin for the entire sheet also serving as the left margin for the column. The center column contains two text lines and two blank lines. The two text lines are to be printed out on the first and third column print lines. The left margin for the center column is the tab 1 position. It is to be noted that the first blank line results from a carrier return (CR) code existing in the text and control code memory. This will be explained further when reference is made to FIG. 2. It is also to be noted that the second column has a different printer font requirement than the remainder of the document. This is denoted by the asterisks. The dashes represent characters and spaces. The asterisks also represent characters and spaces, but in a different font than those represented by the dashes. The right column contains four text lines with the left margin being the tab 2 position.

X and Y represent the last characters of the above referred to two sets of lines. A, B, and C represent the last characters in each of the columns.

Figure 2:
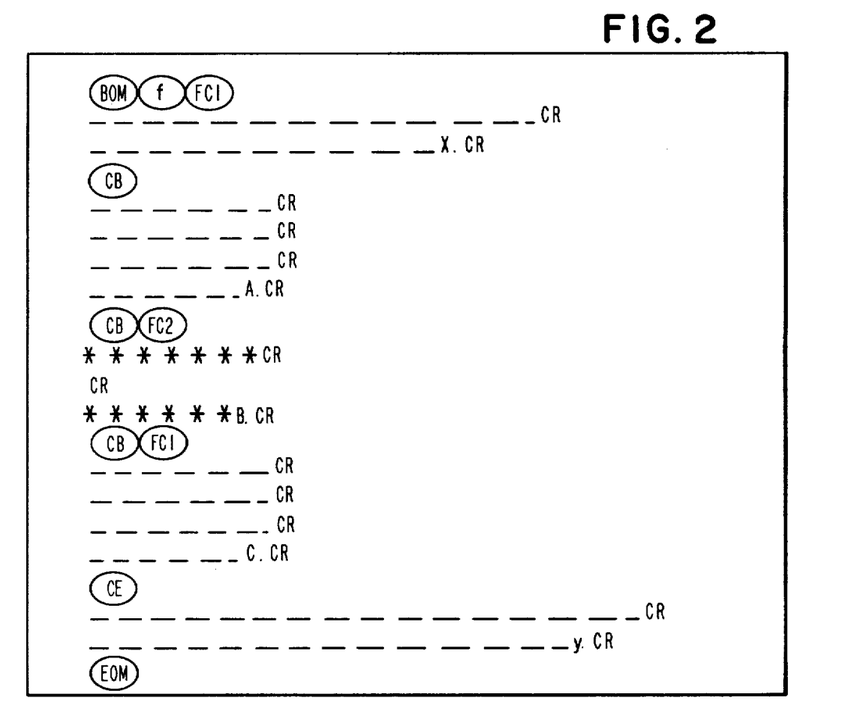
FIG. 2 is a pictorial representation of a buffer stored text and control code memory arrangement for obtaining the desired format shown in FIG. 1 upon playout.

Refer next to FIG. 2. This figure is illustrative of the serial memory format made up of text and control codes stored in a text and control code buffer upon setup and input keying. That is, there is a stream of text (characters, spaces, etc.) and control (beginning of memory, column begin, carrier return, font identification, etc.) codes serially stored or accessible from the buffer. It is to be pointed out that printing during input keying will not exactly correspond to the pictorial representation of the memory shown in FIG. 2. This is because the beginning of memory (BOM), operation flag (f), font identification code (FCX), carrier return (CR), column begin (CB), column end (CE), and end of memory (EOM) codes will exist in memory, but not printed. It is also to be pointed out that since the same input/output device is used for input keying, printing, and storage, as will be used for output printing, the operator will set the left and right margins Lm and Rm and the tab positions tab 1 and tab 2 as shown in FIG. 1.

From the above, the system of this invention contains a page buffer (illustrated as shift register storage 19 in FIG. 18) for storing text and control codes to establish a text and control code memory. The beginning of the stored page is marked by a beginning of memory (BOM) code and the end of the page is marked by an end of memory (EOM) code. During input keying, the operator can key the beginning of memory (BOM) code or it can be input into memory by the system. In any event, this is considered to be no part of this application or invention. The flag (f) (or alternatively, operation flag) code shown following the beginning of memory (BOM) code defines the operating point and will be addressing the next character or control code in memory to be operated upon at any particular time. The next code keyed by the operator will be the font identification code which in this case is denoted by FC1. Then the operator will begin keying text from the left margin Lm. When the right margin Rm is approached and an acceptable line ending is reached, a carrier return (CR) will be keyed. The results are that the printer carrier (not shown) will be returned to the left margin Lm and the printer platen (not shown) will be indexed. Thereafter, the second line will be keyed and followed by a carrier return (CR).

The font identification code FC1 preceding the first two lines establishes the font requirement for these two lines and will continue in effect in the absence of subsequent font identification codes. As pictorially represented in FIG. 2 following the first two lines, three test columns have been keyed and stored. The first of these columns, as pointed out with reference to FIG. 1, has the same font requirement as the first two lines of text. Therefore, the operator will key only a column begin (CB) code at the beginning of keying of the first column. Thereafter, the text for the first column will be keyed. Since the second column is to have a font type different from that of the first column, a new font identification code (FC2) will be keyed identifying the font type for the second column. This code will be keyed following a column begin (CB) code keyed for the second column. Then, as before, text is keyed.

The third column is to have a different font type from that of the second column (but the same as that of the first column). Following the column begin (CB) code for the third column, a font identification code FC1 is keyed. This specifies the font type for the third column. Thereafter, the columnar text for the third column is keyed. Since the last two lines of the page require the same font type as the last column, only a column end (CE) code is keyed following the last line of the last column. Thereafter, the text for the last two lines is keyed and an end of memory (EOM) code is stored by either the system or operator keying.

Figure 3:
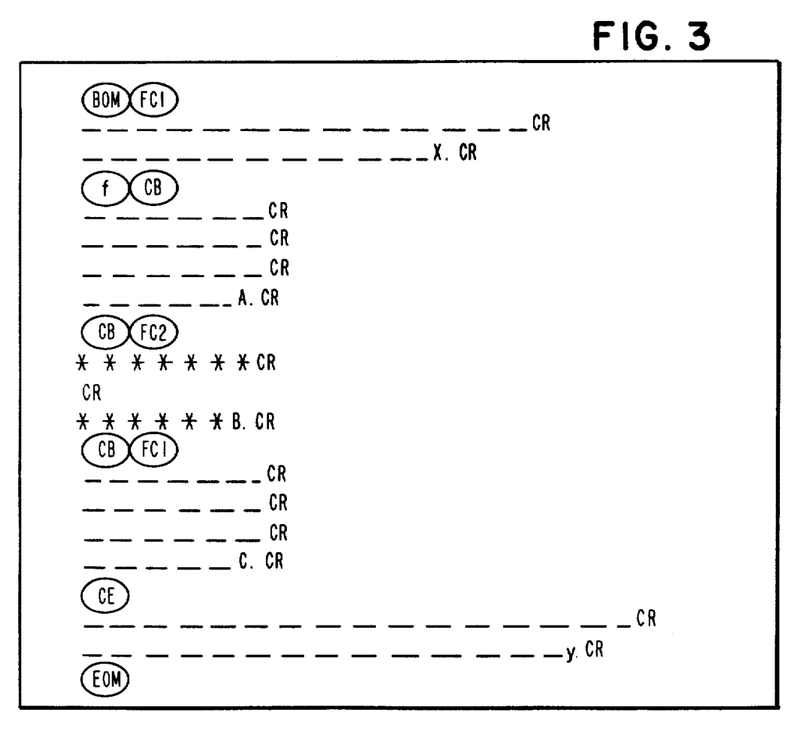
FIG. 3 is a pictorial representation of the memory prior to a beginning of playout of the first of the columns depicted in FIG. 1.

Refer next to FIG. 3. This figure is a pictorial representation of the memory prior to the beginning of playout of the first column. The flag (f) code is addressing the first column begin (CB) code which defines the beginning of the first column. At this time, the carrier will be positioned at the left margin Lm with the first two lines already having been printed as illustrated in FIG. 4.

Figure 4:
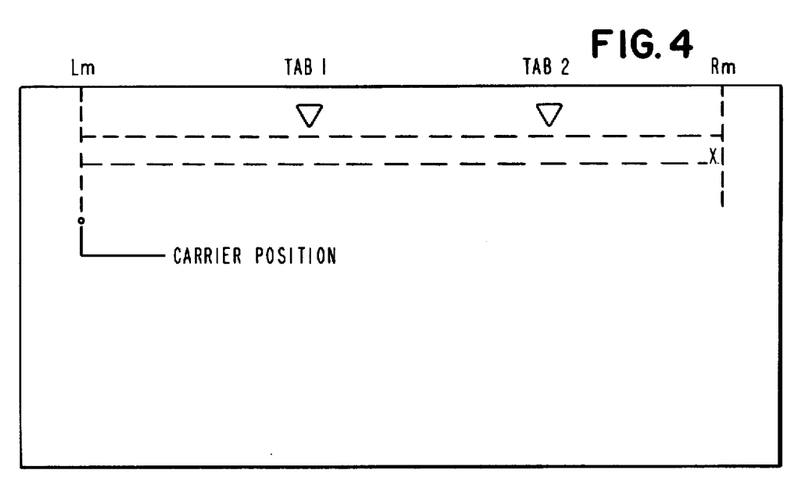
FIG. 4 illustrates the printed page and printer carrier position following printout of the first two text lines from the memory shown in FIG. 3.
Figure 5:
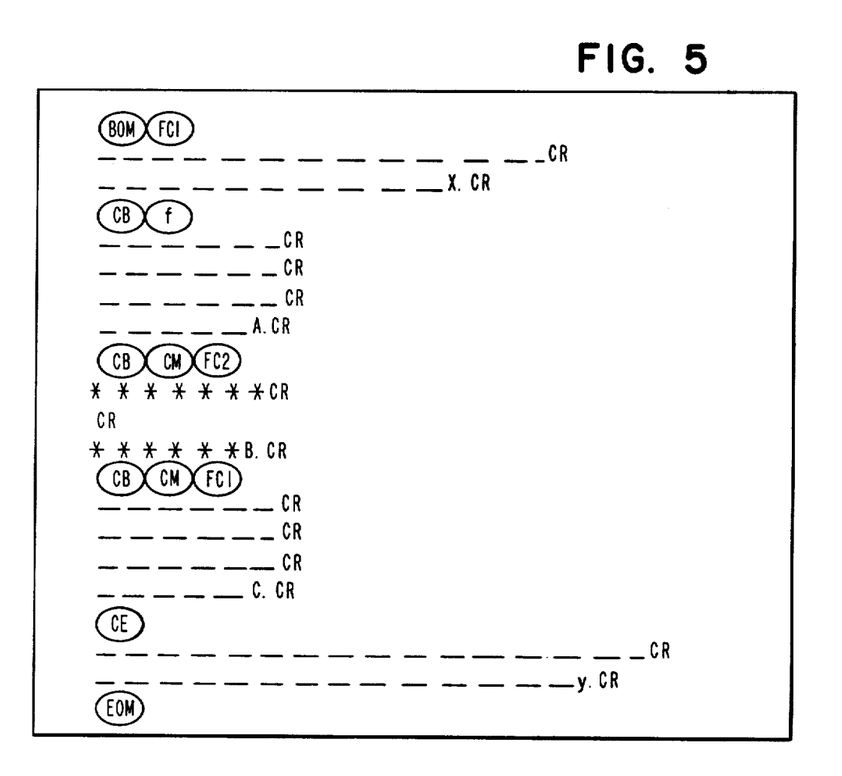
FIG. 5 is a pictorial representation of the memory following setup for playout of the columns in a side-by-side format.

With the memory corresponding to FIG. 3 and the printed page and printer carrier position corresponding to that illustrated in FIG. 4, a scan operation is performed and column marker (CM) codes are inserted in the memory following each column begin (CB) code except the first. The flag is then advanced past the first column begin (CB) code. This is illustrated in FIG. 5 with the flag (f) addressing the first text code in the first column. Printout of first line of the first column is now ready to begin.

The column marker (CM) codes have been inserted following the column begin (CB) codes for the second and third columns to identify the point of flag (f) is to be advanced to during column advance operations. When the flag (f) addresses a carrier return (CR) code not in the last column, the printer carrier is caused to escape rather than return to the left margin Lm. The flag (f) is advanced past the carrier return (CR) code, and a column advance operation and accompanying scan operation is initiated. This is to advance the flag (f) to the next print point in another column and at the same time scan the memory up to the next print point.

Figure 6:
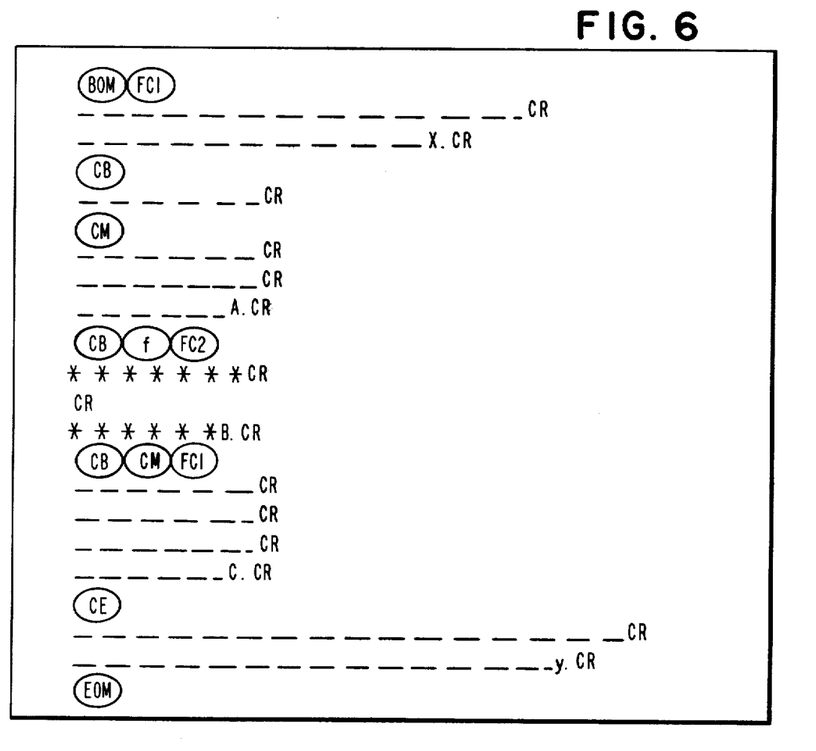
FIG. 6 is a pictorial representation of the memory after printout of the first line of the first column of text.

Referring next to FIG. 6 there is shown a pictorial representation of the memory arrangement following playout of the first line of the first column. A column marker (CM) code has been written over the operation flag (f) at the end of the first line of the first column and before the beginning of the second line of the first column. The next column marker (CM) code has been written over with a new flag (f). This occurred during a column advance operation. If text codes were to follow the flag (f) in memory, actual printout would be ready to continue for the first line of the second column. As illustrated though, a font identification code (FC2) follows the flag (f) and is addressed thereby.

Figure 7:
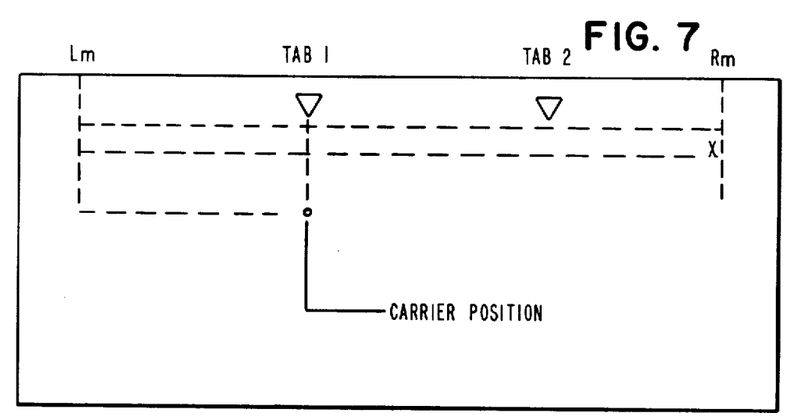
FIG. 7 illustrates the printed page and carrier position after printout of the first line of the first column.
Figure 8:
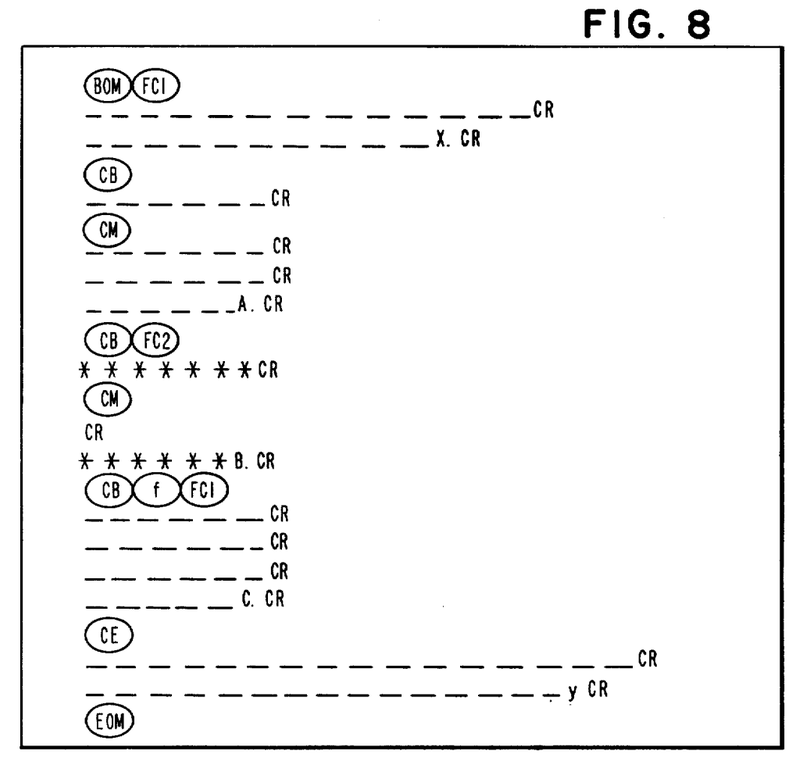
FIG. 8 is a pictorial representation of the memory after printout of the first line of the second column.
Figure 9:
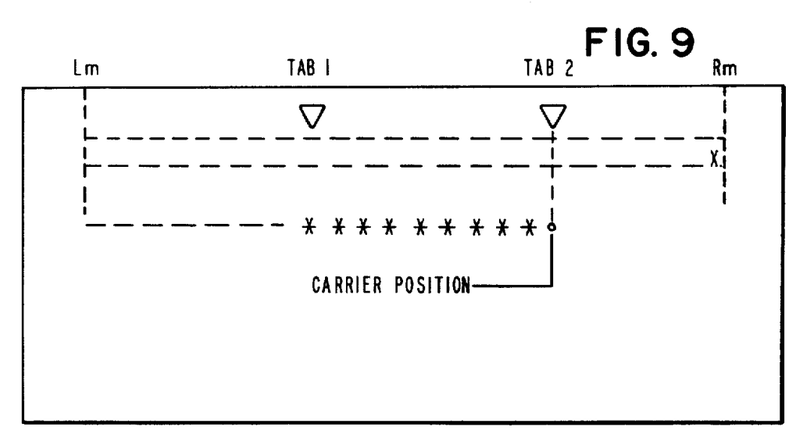
FIG. 9 depicts the printed page and carrier position after printout of the first line of the second column.

In terms of actual sequence of events, when the flag (f) addresses the carrier return (CR) code, the carrier is caused to escape. The flag (f) is then advanced past the carrier return (CR) code and a column advance operation is initiated. During this operation, a column marker (CM) code is written over the flag (f) and a new flag (f) is written over the next detected column marker (CM) code during the scan operation accompanying the column advance operation. FIG. 7 illustrates the carrier position and printed page prior to playout of the first line of the second column. Since the flag (f) is addressing font identification code FC2, the system will alert the operator to make a physical font change, and advance the flag (f) beyond the font identification code FC2. Once the operator has changed fonts, printing of the first line of the second column will begin. This can be through the operator depressing a start button. Printing will then be to the next carrier return (CR) code in memory. Once again, the flag (f) is advanced beyond the carrier return (CR) code and a column advance operation is initiated. A column marker (CM) is written over the flag (f), and a new flag (f) is written over the column marker (CM) following the column begin (CB) code for the third column. FIG. 8 is a pictorial representation of the memory arrangement at this time. FIG. 9 illustrates the printed page and printer carrier position prior to printout of the first line of the third column. The carrier, due to having been escaped through a tabbing operation upon detection of the carrier return (CR) code, will be positioned at the tab 2 position.

The flag (f) is now again addressing a font identification code (FC1). This causes the printing operation of the printer to cease, the operator to be alerted to change fonts and the operation flag (f) to be advanced beyond the font identification code (FC1).

Up to now, the direction of the application has been toward font identification codes (FCX) only affecting the beginning of text lines or columns. It is to be appreciated that a font identification code (FCX) can appear at the beginning of a line, at the end of a line, or at any point in between and still cause printing to cease and the operator to be alerted.

Figure 10:
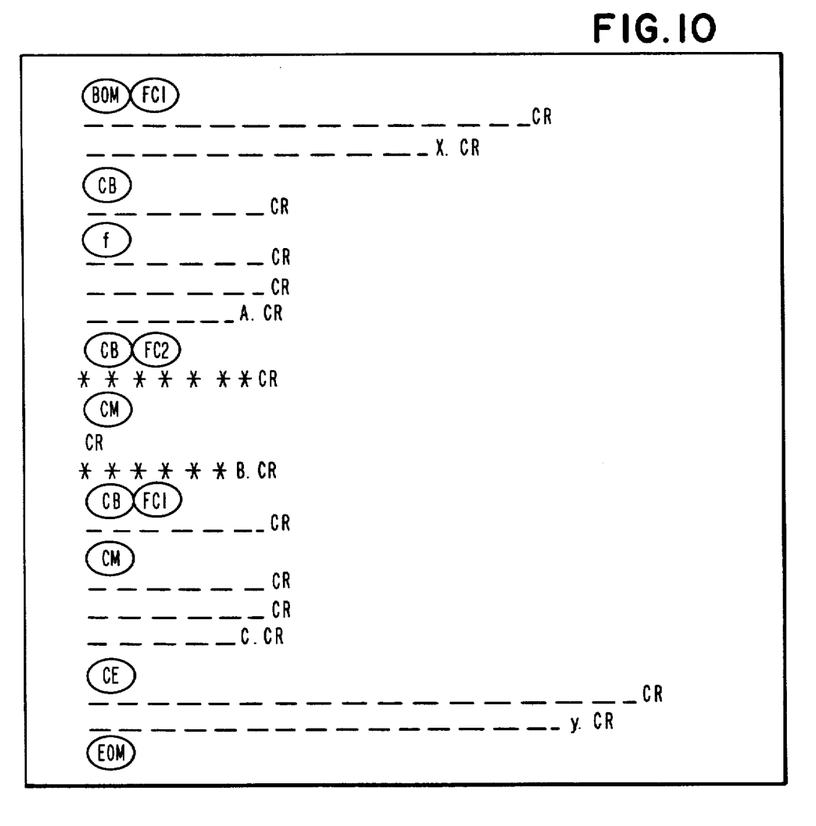
FIG. 10 represents the memory arrangement following printout of the first line of every column on the first print line.
Figure 11:
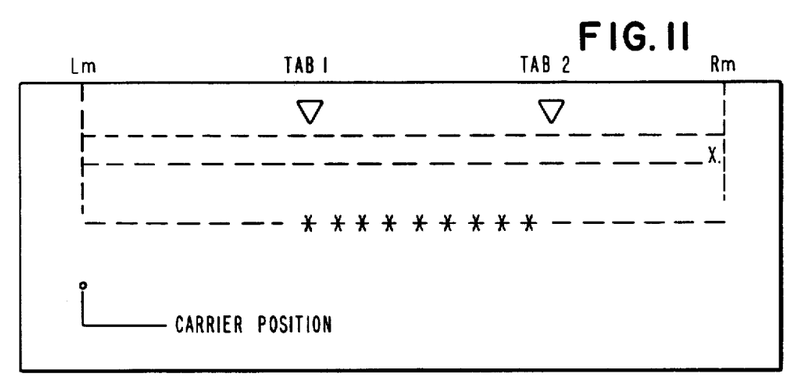
FIG. 11 illustrates the printed page and carrier position following printout of the first line of the third column.

Following printout of the first line in the last column, the flag (f) in memory will be following the carrier return (CR) code. A column advance operation is performed wherein a new column marker (CM) is written over the flag (f) and a new flag (f) is written over the next column marker (CM) code. FIG. 10 illustrates the memory arrangement following both the printout of the first line of the last column and a column advance to the second line of the first column. The printer carrier will be positioned as shown in FIG. 11.

During the memory scan operation accompanying the column advance operation for advancing the flag (f) from the last column to the first, the font identification code FC1 for the first two lines of the page is detected. A comparison is made with the font identification code FC1 for the last column. In this case, there is a comparison, the operator is not alerted, and printing continues for the second line of the first column.

Figure 12:
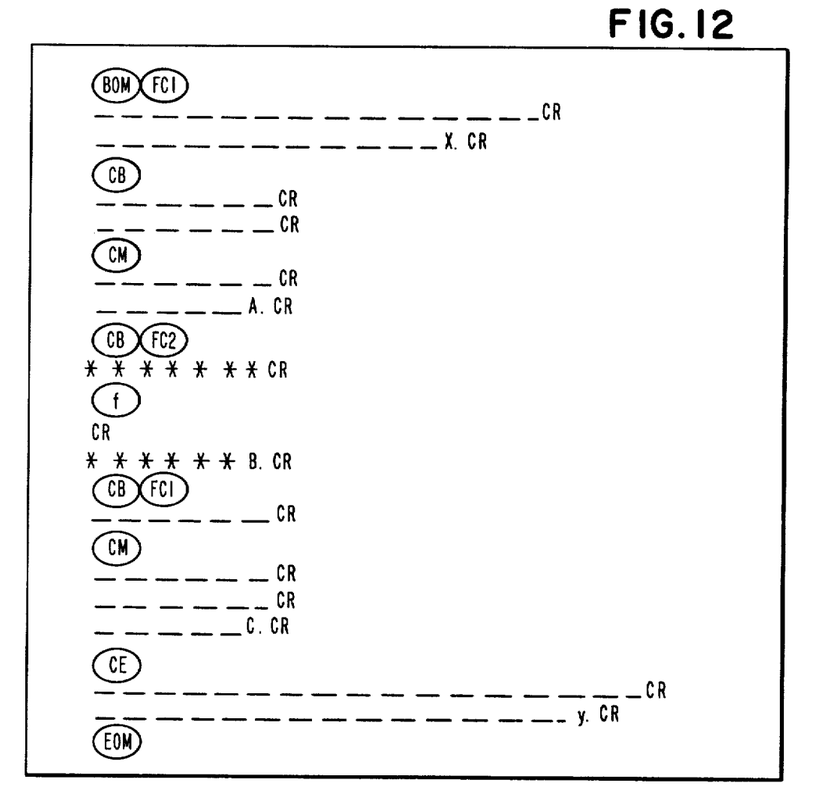
FIG. 12 is a pictorial representation of the memory following printout of the second line of the first column.
Figure 13:
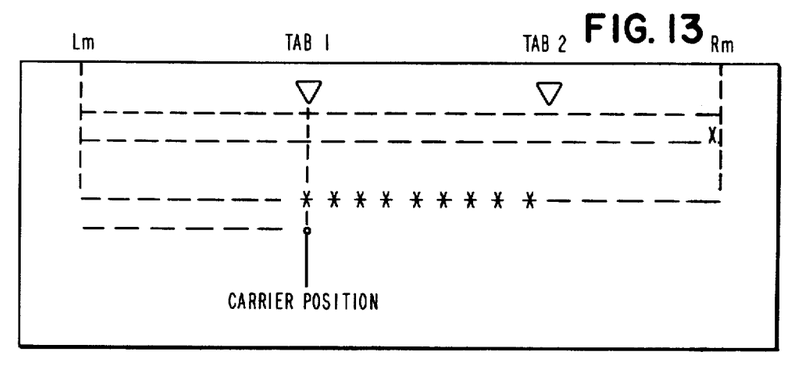
FIG. 13 illustrates the printed page and printer carrier position prior to playout beginning with the second line of the second column.
Figure 14:
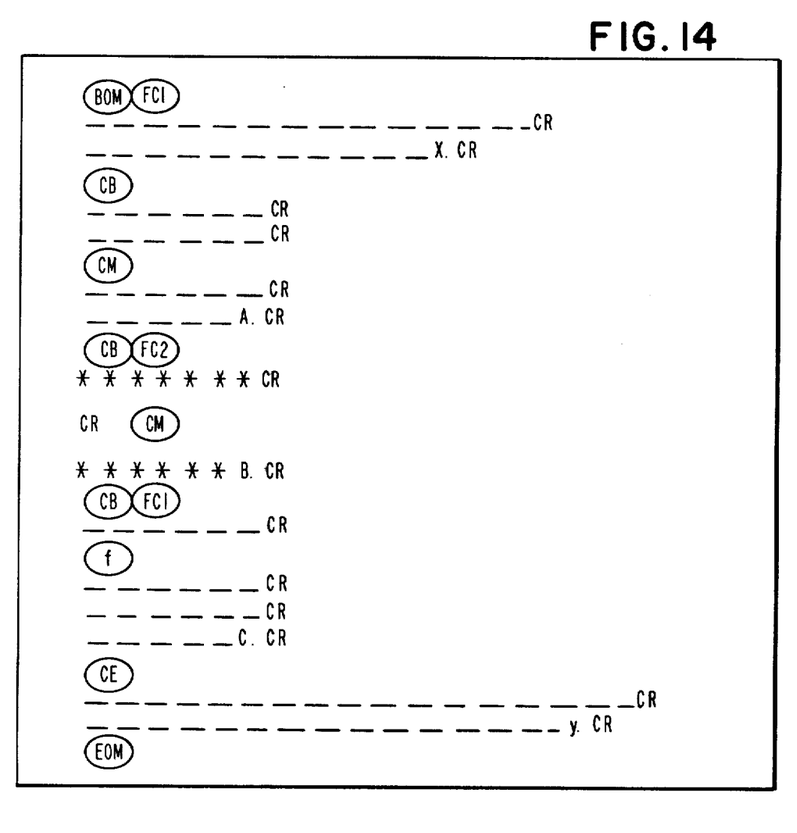
FIG. 14 is a representation of the memory prior to printout of the second line of the third column.
Figure 15:
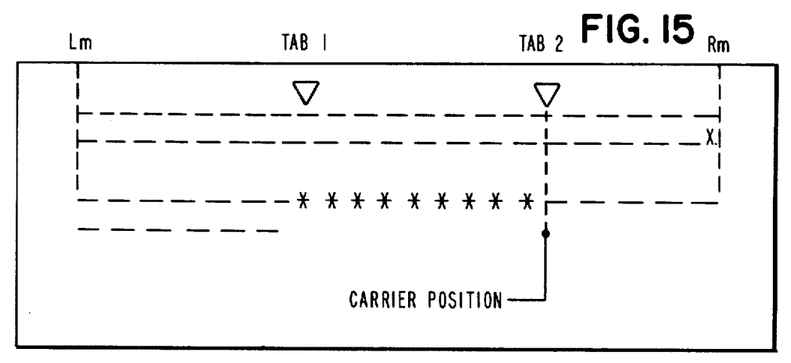
FIG. 15 depicts the printed page and carrier position prior to printout of the second line of the third column.

Following printing of the second line of the first column, a column advance operation is performed to advance the flag (f) to the second line of the second column. The memory arrangement will be as shown in FIG. 12 with the printed page and printer carrier position as shown in FIG. 13. During the memory scan operation accompanying the column advance operation to the second line of the second column, font identification code FC2 is detected. Following the scan, a compare operation will be performed. FC2 is different from FC1, and would normally cause the operator to be alerted. However, prior to alerting the operator, the system detects that the only code on this line is a carrier return (CR) code. In this case the system will not alert the operator. There is no need to alert the operator at this time since no text is to be printed from the second column on the second print line. The flag (f) is advanced past the carrier return (CR) code, and a column advance operation and a scan operation are performed. The carrier is caused to escape to the tab 2 position and the flag (f) is advanced to the second line of the third column. The conditions now in effect are depicted in FIGS. 14 and 15.

The memory scan operation associated with the column advance operation to advance the flag (f) to the third column results in FC1 being detected. A comparison with the font identification code FC1 for the first column will indicate that they are the same, and therefore, no font change is required. In this case, printing automatically continues without a font change.

Figure 16:
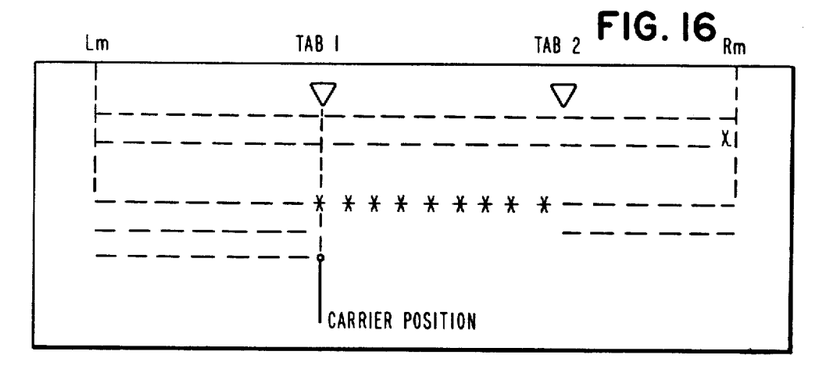
FIG. 16 illustrates the printed page and carrier position prior to printout of the second line of the second column on the third print line.
Figure 17:
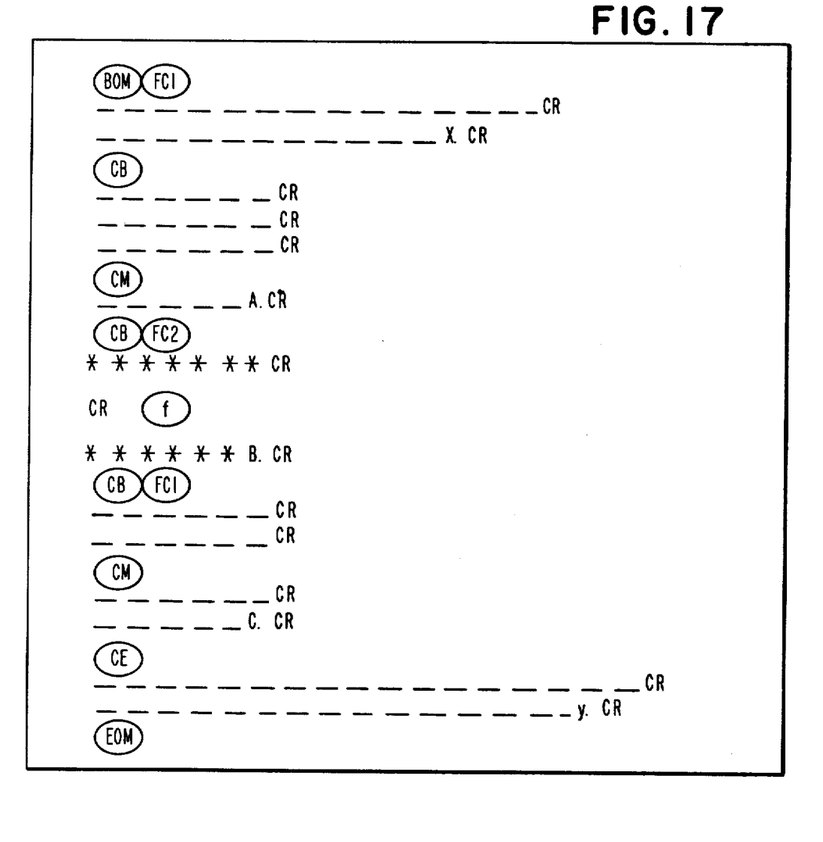
FIG. 17 is a pictorial representation of the memory prior to printout of the second line of the second column on the third print line.

The above described playout operations continue, and when playout is complete following printout of the third line of the first column, the carrier is advanced to the tab 1 position as shown in FIG. 16. FIG. 17 is an illustration of the memory organization at this point. The flag (f) has been advanced and the memory scanned. Once again, FC2 has been detected for the second column. A comparison with the font identification code FC1 in effect for the first column indicates that a font change is required. This time, since text follows the flag (f), printout ceases and the operator is alerted. The operator will change fonts and cause playout operations to continue.

During later playout when a column advance operation is performed from the fourth line of the first column to the fourth line of the second column, FC2 is detected during the accompanying memory scan operation. A non-compare will exist. However, a column begin (CB) code will be detected following the flag (f). This signifies that no printout is required on the fourth print line from the second column. Thus, no font change is necessary, and another column advance operation is performed to the third column.

When playout of the side-by-side text is complete, the column marker (CM) codes are removed from the memory, and another memory scan operation is performed. This will reveal that the font requirements for the final paragraph (last two lines in FIG. 1) are the same as that in effect when playout was completed for the side-by-side text. Therefore, no font change is required, and playout automatically continues.

Overall System Structure

Figure 18:
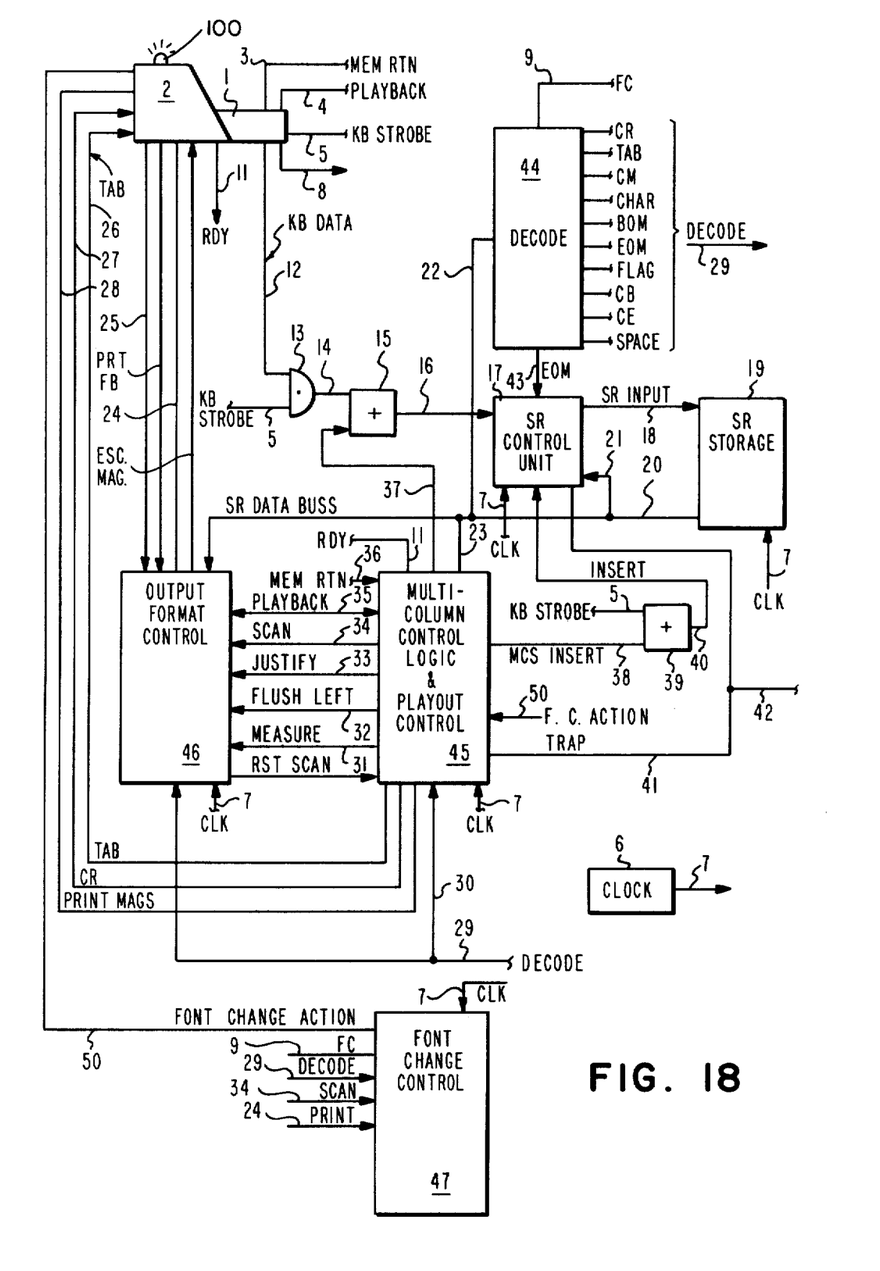
FIG. 18 is an overall block diagram illustrating the structure according to this invention for accomplishing the side-by-side printout of columns with different printer font requirements.

Referring next to FIG. 18 and beginning in the upper left hand corner, there are shown a keyboard 1 and a printer 2. The output of keyboard 1 is along the memory return line 3, the playback line 4, the keyboard strobe line 5, and the keyboard data line 12. An output along keyboard strobe line 5 is a timing signal indicating the presence of a data (text or control) code on keyboard data line 12. Although line 12 has been represented as a single line, it is to be appreciated that it is representative of a number of lines capable of carrying bits making up a data byte. This is also the case with following referred to lines which carry data. Data which is keyed on keyboard 1 and appears on data line 12 is applied to AND gate 13. Upon the occurrence of a keyboard strobe signal along line 5, the data is gated through AND gate 13 and along line 14 to OR gate 15. The data is then output along line 16 to shift register control unit 17. Data input to shift register control unit 17 along line 16 is then output along the shift register input line 18 to shift register 19 for storage. Shift register 19 is the text and control code buffer referred to above. Character, beginning of memory, column marker, font identification, etc., codes are stored therein and form the memory referred to above. The timing of shift register control unit 17, shift register 19, output format control 46, font change control 47, and multi-column control logic and playout control 45 is controlled by the output of system clock 6 along line 7. The data input into the shift register 19 along line 18 circulates out of shift register 19 back into the shift register control unit 17 along lines 20 and 21. The data circulating out of shift register 19 along line 20 is also applied along line 23 to multi-column control logic and playout control 45. The data appearing on line 20 which represents a shift register data buss is also applied to the output format control 46.

Further, the data appearing on the shift register data buss 20 is applied along line 22 to decode 44. It is to be appreciated that as far as the inputs to, and outputs from, the shift register 19 are concerned, all are considered data. This will include font identification codes, as well as other control codes, and character codes. The outputs of decode 44 are a font identification signal FC along line 9, an end of memory (EOM) signal along line 43, and other character and control code signals along decode line 29 upon decode of codes input to decode 44 along line 22.

The font change control 47 monitors the output of decode 44 for a font identification signal along line 9. Monitoring occurs when a scan signal is applied along line 34 from multi-column control logic and playout control 45 to output format control 46 and font change control 47. A signal is applied along the scan line 34 during a column advance operation. This operation is initiated by logic and control 45 to review data (text and control codes) between the last printout point and the next printout point. During this review, font identification code signals can be used in a compare operation to determine any font change requirements as will be explained hereinafter. Monitoring also occurs when a print signal is applied along line 24 from output format control 46 to printer 2 and font change control 47. A signal is applied along the print line 24 after a column advance operation has been performed and during printout by printer 2 of characters stored in the shift register 19. Thus, both the print signal along line 24 and the scan signal along line 34 from logic and control 45 are applied at different times to font change control 47 to cause control 47 to monitor the outputs of decode 44. This monitoring is in addition to the monitoring of decode 44 by logic and control 45 along lines 29 and 30 and control 46 along line 29. A down signal is applied along line 24 after a carrier return (CR) code is decoded by decode 44 from shift register 19 during printout. Thereafter, a column advance operation is to be initiated by logic and control 45.

In this application, reference generally to signals is to be taken as including "up" or "positive" logical levels. Reference to "down" signals is to be taken as including "negative" logical levels.

Although only one line 9 is represented, in actuality there can be as many lines as there are fonts to be utilized in printing with the system. For the examples described in the Operations to be Performed section of this application, two FC lines would be connected to decode 44 along which different FC signals would be separately applied upon decodes of FC1 and FC2. As pointed out above, font change control 47 monitors decode 44 when a signal is applied along scan line 34. This is to detect any font identification codes during a column advance operation. Monitoring of decode 44 when a signal is applied along print line 24 causes font change control 47 to store a detected font identification code. A signal will then be applied along line 50 to printer 2 to alert the operator of a required font change. The alerting of the operator when a font change is required can be by blinking light 100, or buzzer, turning on a lighted message panel, etc. Monitoring and storage in both cases referred to in this paragraph will be explained in greater detail later when reference is made to FIG. 19.

Referring again to the upper left hand corner of FIG. 18, printer 2 causes a ready signal to be applied along line 11 when, for example, printer 2 is idle and ready for printing a character. This signal is applied to multi-column control logic and playout control 45. Logic and control 45 has a number of output lines such as line 28 connected to print magnets (not shown) of printer 2. Other output lines from logic and control 45 include a carrier return line 27 for causing the printer 2 to perform a carrier return operation and a tab line 26 for causing the printer 2 to escape when corresponding signals are applied therealong. Other outputs, as well as inputs to control 45, are along lines 31, 32, 33, 35, 36, and 37. These lines are set forth in the above referenced U.S. Pat. No. 3,952,852, and have no direct bearing on this invention. This is also the case for lines 38, 40, 41, and 42, the lines designated PRTFB and ESC. MAG., and gate 39.

Shift register control unit 17 and shift register 19 together provide a subsystem which allows character and control codes to be inserted into, and rearranged within, the memory. Shift register control unit 17 and shift register 19 and the interrelationship therebetween are set out in U.S. Pat. No. 3,952,852 and patents referred to therein.

Font Change Control

Figure 19:
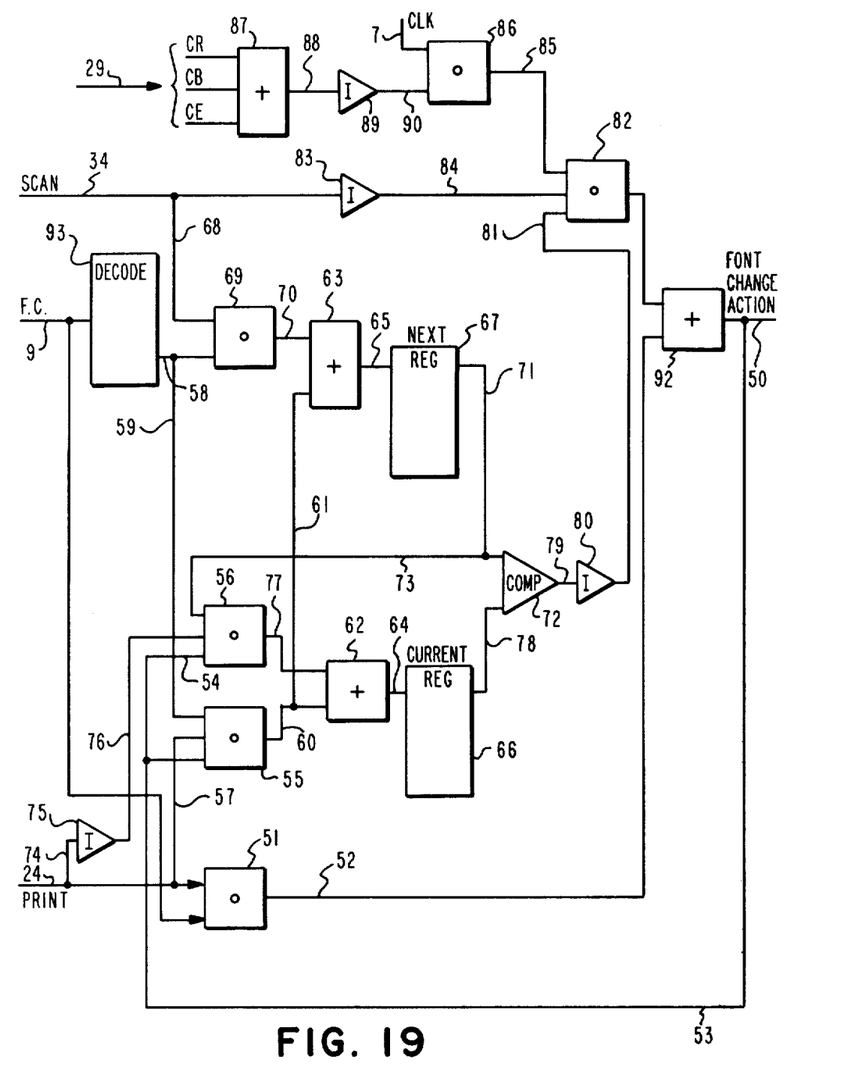
FIG. 19 illustrates the structure included in the font change control of FIG. 18.

Refer next to FIG. 19. This figure sets forth the detailed structure of the font change control 47 of FIG. 18. As pointed out above, a signal applied along line 24 from output format control 46 will cause system printer 2 to print. This signal is also applied to AND gate 51. The other input to AND gate 51 is along the font identification code signal line 9. When a font identification code signal appears on line 9 from decode 44, the conditions are met for gating a signal along line 52 to OR gate 92. The output of OR gate 92 is applied along line 50 to signal the operator of a required font change. This output is also applied along lines 53 and 54 to AND gates 55 and 56, respectively.

Another input to AND gate 55 is along the print line 24 and then along line 57. The remaining input to AND gate 55 is a font identification code output from decode 93 along lines 58 and 59. The font identification code, when gated through AND gate 55, is applied along lines 60 and 61 to OR gates 62 and 63, respectively. This code is then applied along line 64 and stored in current register 66, and along line 65 and stored in next register 67. Therefore, during a printing operation (printout) from memory, both registers 66 and 67 are loaded with the detected font identification code.

During a scan operation, a signal is applied along lines 34 and 68 to AND gate 69. This permits a font identification code signal decoded by decode 93 and applied along line 58 to be gated along line 70 to OR gate 63, and then along line 65 for storage in next register 67. For a compare operation following the loading of next register 67, the code stored therein is applied along line 71 to compare unit 72. This code is also applied along lines 71 and 73 to AND gate 56. Another input to AND gate 56 originates from the print line 24. Since the printer 2 is not printing during a scan operation, a down signal is applied along lines 24 and 74 to inverter 75. The up output of inverter 75 is applied along line 76. The remaining input to AND gate 56 is "down" along lines 53 and 54 since a signal has not yet been applied along line 50. Under the above conditions, the code stored in next register 67 is not transferred along line 77 to OR gate 62, and then along line 64 to current register 66. The other input to compare 72 is along line 78 from current register 66. Therefore, a comparison is made during a scan operation with the detected font identification code which is stored in the next register 67 and a previously stored font identification code in the current register 66. For example, while printing in the first column in FIG. 1, FC1 would be stored in both registers 66 and 67. During a scan operation accompanying a column advance operation to the second column, FC2 would be detected and written over FC1 in next register 67. In this case, there will be a non-compare, and a down signal will be applied along line 79 to inverter 80. The resulting up signal is applied along line 81 to AND gate 82. Another input to AND gate 82 is along line 84 which is the inverse of the signal applied along line 34 from inverter 83. Thus, there will be no output from AND gate 82 to alert the operator during a scan operation. The remaining input to AND gate 82 is along line 85 from AND gate 86. One input to AND gate 86 is the clock signal along line 7. The remaining input to AND gate 86 is represented as the inverse of the carrier return (CR), column being (CB), or column end (CE) control code signals applied along line 29 to OR gate 87. The output of OR gate 87 is applied along line 88 to inverter 89 and the inverse thereof is applied along line 90.

When a scan signal is applied along line 34 by the multi-column control logic and playout control 45, any font identification code detected is stored in the next register 67. There is no need to alert the operator for different font identification codes detected during the scan operation. When the scan operation is complete, as determined by detection of the next column marker (CM) code, an up output from inverter 83 is applied along line 84. The column marker (CM) will determine the beginning of printout. A non-compare of the contents of registers 66 and 67 will result in an up input or signal along line 81 to AND gate 82. If a character follows the font identification code, an up signal will be applied along line 85 to AND gate 82 on the next clock time. A signal will be applied along line 50. The operator will be alerted to change fonts at this time. This will cause the contents of register 67 to be transferred to register 66 through AND gate 56. On the other hand, if a CR, CB, or CE follows the font identification code, a down signal is applied along line 85 to AND gate 82. This signifies that no text is to be printed from the affected column. No font change is required at this time and the operator is not alerted. Another scan operation is performed to the next column begin (CB) code. From the above example, if the second column were to contain no text to be printed, FC1 would be detected for the third column. This would compare with FC1 with the first column and automatic playout would continue.

In summary, a system is provided having a keyboard and printer, a buffer and control, a multi-column playout control, and a font change control having included printer font identification code stores. During input keying setup for later playout, font identification codes are keyed and stored along with text codes in a text and control code buffer. For text columns which are to be printed out in a side-by-side format with varying font requirements, the storing upon keying of the columns and font identification codes therefor is sequential. When printout begins, the first detected printer font identification code is stored in the font change control. Thereafter, when a column advance operation is initiated following printing of one line of a column on a print line to begin printing any corresponding line from the next column, there is a scan of the memory established during input keying and storage of text and font identification codes in the buffer. This is to detect any required change in printer fonts. A comparison is made between the last printer font identification code detected during the scan and the font identification code stored by the system in the font change control. If there is a difference, the system will alert the operator to effect a physical printer font change. If, however, no printout is required in the next column, due to an extra carrier return, or previous completion of printing of the next column, the system will not alert the operator. In this case, the system will advance to the next column for printout.

While the invention has been particularly shown and described with reference to a particular embodiment, it will be understood by those skilled in the art that various changes in form and detail may be made without departing from the spirit and scope of the invention.

What is claimed is:

1. A system for interrupting, when a font change is required, automatic playout of a plurality of sequentially stored text columns which are to have corresponding portions thereof printed on the same print line to form a multi-column format prior to causing a printer carrier return, said system comprising:
   (a) buffer means having font identification and text codes for said text columns stored therein with each font identification code identifying a font for all following text codes regardless of column location up to a subsequent font identification code;
   (b) means for reading said font identification and text codes in said buffer means for and during a printout of text for said text codes;
   (c) first and second storage means for storing said font identification codes;
   (d) means for storing a font identification code read by said reading means in both of said first and second storage means during said printout;
   (e) means upon reading a subsequent font identification code for interrupting said printout;
   (f) means for performing a column advance operation between printout of said corresponding portions of said stored text columns;
   (g) means included in said means for performing a column advance operation for scanning said font identification and text codes to detect any font identification codes from the end of printout of one of said portions to the beginning of printout of a subsequent portion; and
   (h) means for storing any detected font identification code in said first storage means upon scanning during a column advance operation.

2. A system according to claim 1 including means for comparing font identification codes stored in said first and second storage means at the beginning of printout of a next of one of said portions.

3. A system according to claim 2 including means responsive to said means for comparing for interrupting said automatic playout when said font identification codes in said first and second storage means do not compare, and causing continued automatic playout when said font identification codes stored in said first and second storage means compare.

4. A system according to claim 3 including means for causing said font identification code stored in said first storage means during playout interruption to be transferred to said second storage means.

5. A system according to claim 4 including means for preventing interruption of said automatic playout when said font identification codes in said first and second storage means do not compare and no printout is to occur for said next one of said portions.

6. A system according to claim 5 wherein said means for performing a column advance operation includes means for performing a column advance operation when no printout is to occur for said next one of said portions.

7. A system according to claim 6 wherein said means for scanning includes means for scanning said font identification and text codes to detect any font identification codes from the point no printout is to occur to the beginning of printout of a subsequent portion.

* * * * *